United States Patent
Lin

(10) Patent No.: US 8,711,086 B2
(45) Date of Patent: *Apr. 29, 2014

(54) METHOD OF MANUFACTURING TOUCH PANEL

(75) Inventor: Chih-Chung Lin, Taipei (TW)

(73) Assignee: Chih-Chung Lin, Taipei (TW)

( * ) Notice: Subject to any disclaimer, the term of this patent is extended or adjusted under 35 U.S.C. 154(b) by 80 days.

This patent is subject to a terminal disclaimer.

(21) Appl. No.: 13/442,874

(22) Filed: Apr. 10, 2012

(65) Prior Publication Data

US 2013/0215072 A1 Aug. 22, 2013

(51) Int. Cl.
*G09G 3/36* (2006.01)
*G06F 3/044* (2006.01)
*G06F 3/046* (2006.01)

(52) U.S. Cl.
USPC .................. 345/104; 178/18.06; 178/18.07; 345/174

(58) Field of Classification Search
USPC ........... 345/87, 156, 173–174, 179–183, 104; 178/18.05–18.07
See application file for complete search history.

(56) References Cited

U.S. PATENT DOCUMENTS

| | | | | |
|---|---|---|---|---|
| 2010/0201647 | A1* | 8/2010 | Verweg | 345/174 |
| 2011/0242023 | A1* | 10/2011 | Lee | 345/173 |
| 2012/0162127 | A1* | 6/2012 | Onoda | 345/174 |
| 2013/0215073 | A1* | 8/2013 | Lin | 345/174 |

* cited by examiner

*Primary Examiner* — Lun-Yi Lao
*Assistant Examiner* — Jarurat Suteerawongsa

(57) ABSTRACT

A method of manufacturing touch panel includes the steps of providing a backlight module having at least one extended wall portion formed therewith, so that a receiving space is enclosed in the extended wall portion; providing a liquid crystal display (LCD) layer and a capacitive sensing layer; providing a bonding layer to bond the LCD layer and the capacitive sensing layer to each other; and positioning the bonded LCD layer and capacitive sensing layer in the receiving space of the backlight module. Any extra amount of the bonding layer flowing out from between the bonded LCD layer and capacitive sensing layer forms an overflowed portion that is stopped by the extended wall portion from entering into the receiving space, so that time and labor costs for removing the overflowed portion in assembling the touch panel are saved and the production yield is increased.

5 Claims, 5 Drawing Sheets

METHOD OF MANUFACTURING TOUCH PANEL

This application claims the priority benefit of Taiwan patent application number 101105171 filed on Feb. 17, 2012.

FIELD OF THE INVENTION

The present invention relates to a method of manufacturing touch panel, and more particularly to a touch panel manufacturing method that reduces assembling time and labor costs.

BACKGROUND OF THE INVENTION

Due to the quick development in the information technological and communication network fields, various kinds of electronic information products have become highly popular among consumers. Meanwhile, touch panels for electronic information products are also quickly developed. According to the sensing principles thereof, the currently available touch panels can be classified into four major types, namely, resistive, capacitive, electromagnetic, and optical touch panels. Among other, the capacitive touch panel is characterized by its good dust resistance, fire resistance and high definition, and is therefore widely welcomed among users. With the capacitive touch panel, the location of a touched point is determined from change in the capacitance of the touch panel. That is, the coordinates of the touched point on the touch panel is determined from the capacitance change between electrodes resulted from the approach of a conductive object, such as a finger, to the touch panel.

The capacitive touch panel has gradually become the mainstream in the touch technology and is applied to various electronic information products, such as cell phones, tablet computers, walkmans, hand-held electronic devices (apparatus), various displays, monitors, etc. According to the technological principle of these electronic information products, the capacitance change of the touch panel resulted from touch of the panel by a finger is used to detect the change of position of the finger on the touch panel and the function selected through touch, so as to achieve the purpose of controlling the display.

In assembling the capacitive touch panel, a liquid crystal display (LCD) layer and a capacitive sensing layer thereof are usually bonded together using an optical clear resin (OCR) or an optical clear adhesive (OCA). After the LCD layer and the capacitive sensing layer are bonded together, an additional procedure is required to remove extra resin or adhesive that flows out from between the bonded LCD layer and capacitive sensing layer. This additional procedure inevitably increases the assembling time and labor costs. In brief, the conventional method of manufacturing the capacitive touch panel has the following disadvantages: (1) high assembling labor cost; (2) long assembling time; and (3) high bad yield.

It is therefore tried by the inventor to develop an improved method of manufacturing touch panel to overcome the problems in the conventional touch panel manufacturing method.

SUMMARY OF THE INVENTION

A primary object of the present invention is to provide a touch panel manufacturing method that reduces assembling time and labor costs.

To achieve the above and other objects, the touch panel manufacturing method according to a preferred embodiment of the present invention includes the following steps: providing a backlight module having at least one extended wall portion formed therewith, so that a receiving space is enclosed in the extended wall portion; providing a liquid crystal display (LCD) layer and a capacitive sensing layer; providing a bonding layer to bond the LCD layer and the capacitive sensing layer to each other; and positioning the bonded LCD layer and capacitive sensing layer into the receiving space of the backlight module.

With the manufacturing method of the present invention, the LCD layer and the capacitive sensing layer are bonded together via the bonding layer and then positioned in the receiving space. Any extra amount of the bonding layer flows out from between the bonded LCD layer and capacitive sensing layer to form an overflowed portion on an outer periphery of the bonded LCD layer and capacitive sensing layer, and the overflowed portion is stopped by the extended wall portion from entering into the receiving space when the bonded LCD layer and capacitive sensing layer are positioned into the receiving space, so that time and labor costs for removing the overflowed portion in the process of assembling the touch panel are saved and the production yield is increased.

Another object of the present invention is to provide a touch panel that is manufactured in a method including the steps of providing a backlight module having at least one extended wall portion formed therewith, so that a receiving space is enclosed in the extended wall portion; providing a liquid crystal display (LCD) layer and a capacitive sensing layer; providing a bonding layer to bond the LCD layer and the capacitive sensing layer to each other; and positioning the bonded LCD layer and capacitive sensing layer into the receiving space of the backlight module.

Preferably, the touch panel of the present invention further includes an electromagnetic sensing panel attached to one side of the backlight module opposite to the LCD layer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
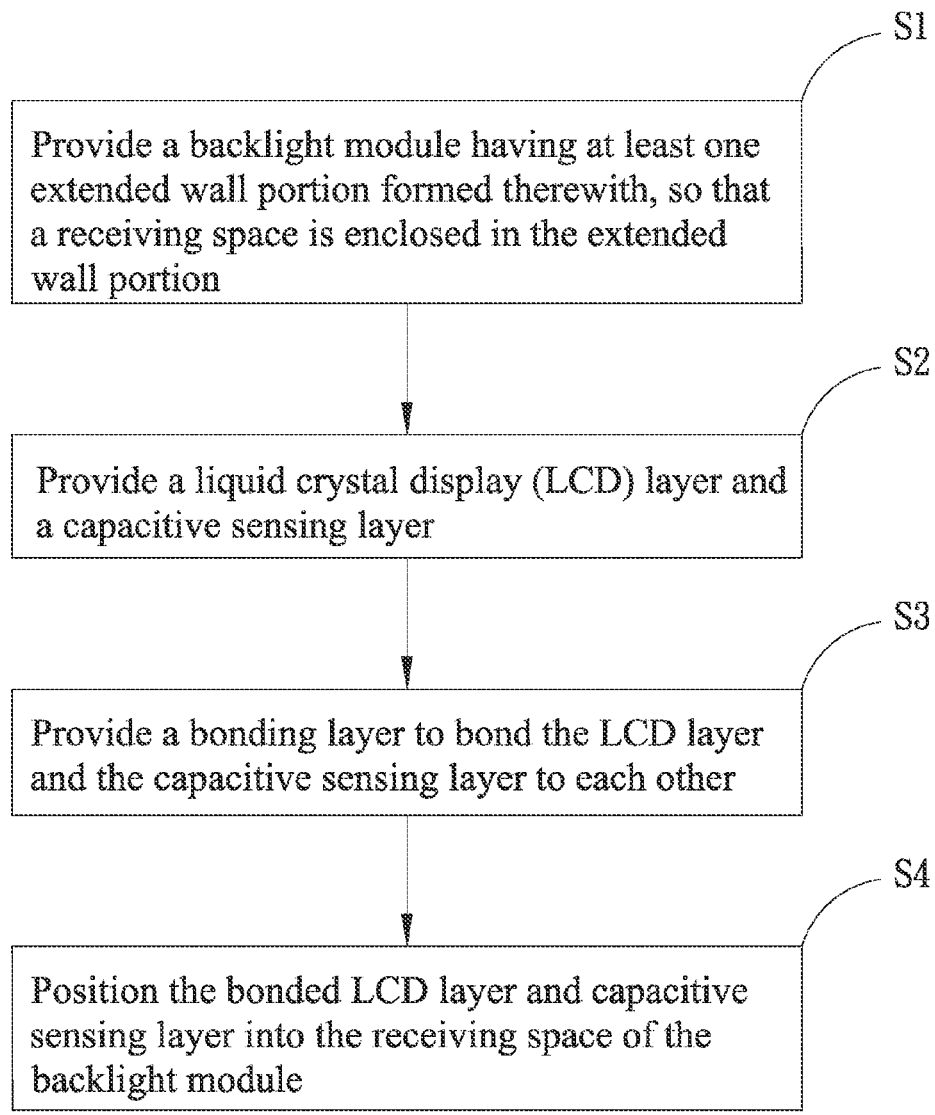
FIG. 1 is a flowchart showing the steps included in a method of manufacturing touch panel according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is a flowchart showing steps S1 to S4 included in a method of manufacturing a touch panel 1 according to a first embodiment of the present invention.

In the first step S1, a backlight module having at least one extended wall portion formed therewith is provided, so that a receiving space is enclosed in the extended wall portion; in the second step S2, a liquid crystal display (LCD) layer and a capacitive sensing layer are provided; in the third step S3, a bonding layer is provided to bond the LCD layer and the capacitive sensing layer to each other; and in the fourth step S4, the bonded LCD layer and capacitive sensing layer are positioned in the receiving space enclosed in the extended wall portion of the backlight module.

Figure 2B:
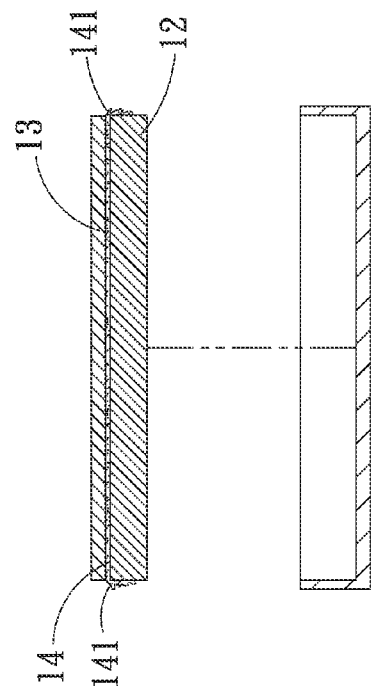
FIGS. 2A to 2D pictorially illustrate the steps in the touch panel manufacturing method according to the first embodiment of the present invention.
Figure 2A:
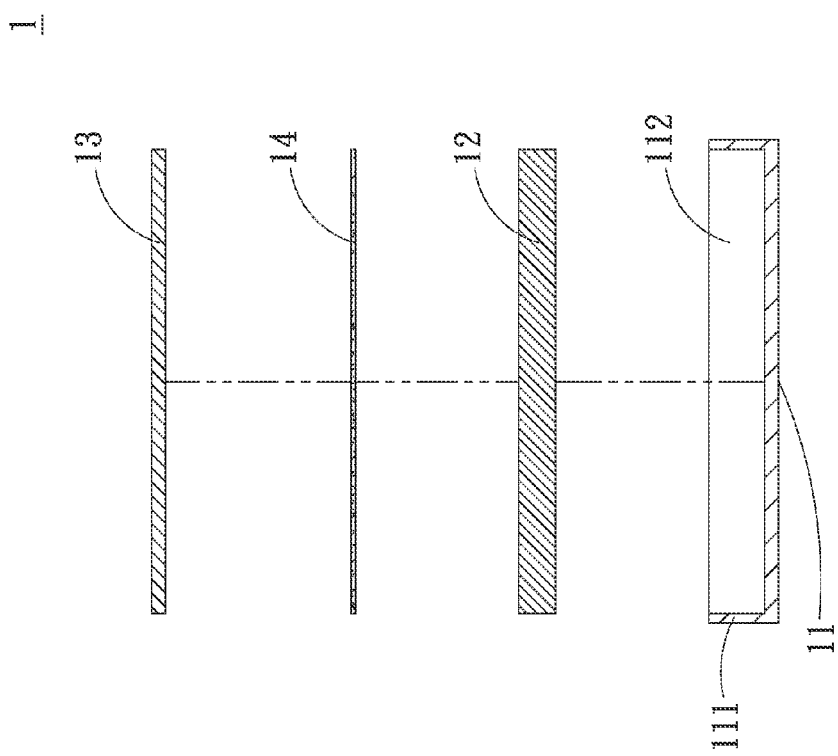

FIGS. 2A to 2D pictorially illustrate the steps in the touch panel manufacturing method according to the first embodiment of the present invention. Please refer to FIG. 1 along with FIGS. 2A to 2D. FIG. 2A generally corresponds to the steps S1 to S3. First, a backlight module 11 is provided. The backlight module 11 is provided along an outer periphery thereof with at least one extended wall portion 111, so that a receiving space 112 is enclosed in the extended wall portion 111 extending along two pairs of opposite edges of the backlight module 11. Then, a liquid crystal display (LCD) layer 12 and a capacitive sensing layer 13 are further provided. In the illustrated first embodiment, the LCD layer 12 uses a glass material as its substrates without being limited thereto. That is, the substrates of the LCD layer may also be made of polyethylene terephthalate (PET), polycarbonate (PC), polyethylene (PE), polyvinylchloride (PVC), polypropylene (PP), polystyrene (PS), polymethylmethacrylate (PMMA), or cyclo olefin copolymer (COC). Further, a bonding layer 14 is provided, which may be a layer of optical clear resin (OCR) or a layer of optical clear adhesive (OCA).

FIG. 2B generally corresponds to the steps S3 and S4. As shown, the LCD layer 12 and the capacitive sensing layer 13 are bonded together via the bonding layer 14. At this point, extra amount of the bonding layer 14 flowing out from between the bonded LCD layer 12 and capacitive sensing layer 13 forms an overflowed portion 141 on an outer periphery of the bonded LCD layer 12 and capacitive sensing layer 13.

Figure 2C:
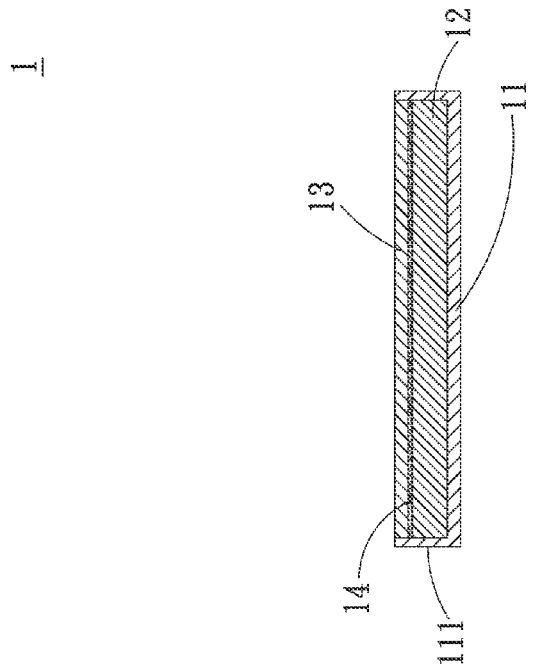
Figure 2D:
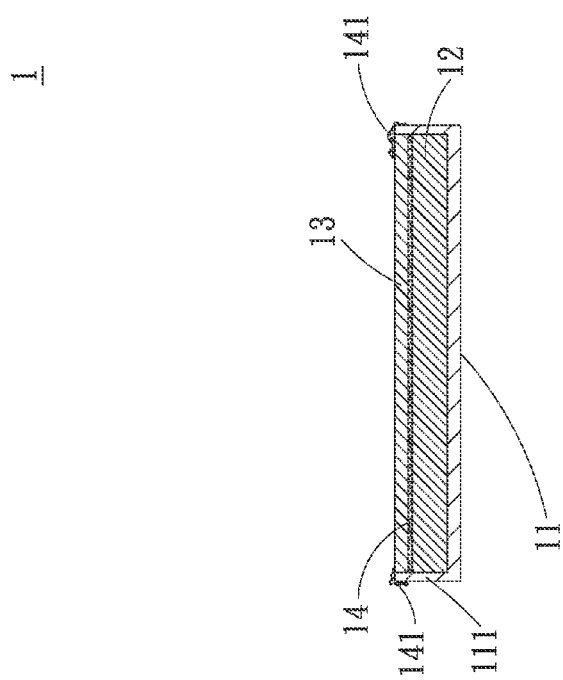

FIGS. 2C and 2D generally correspond to the steps S4. As shown, the bonded LCD layer 12 and capacitive sensing layer 13 are then positioned in the receiving space 112 of the backlight module 11. At this point, the overflowed portion 141 of the bonding layer 14 is stopped by the extended wall portion 111 from entering into the receiving space 112, allowing the outer periphery of the bonded LCD layer 12 and capacitive sensing layer 13 to fitly contact with the extended wall portion 111 to complete the forming of the touch panel 1. In this manner, additional procedure for removing the overflowed portion 141 can be saved to reduce the assembling time and labor cost and to increase the production yield of the touch panel.

Figure 3:
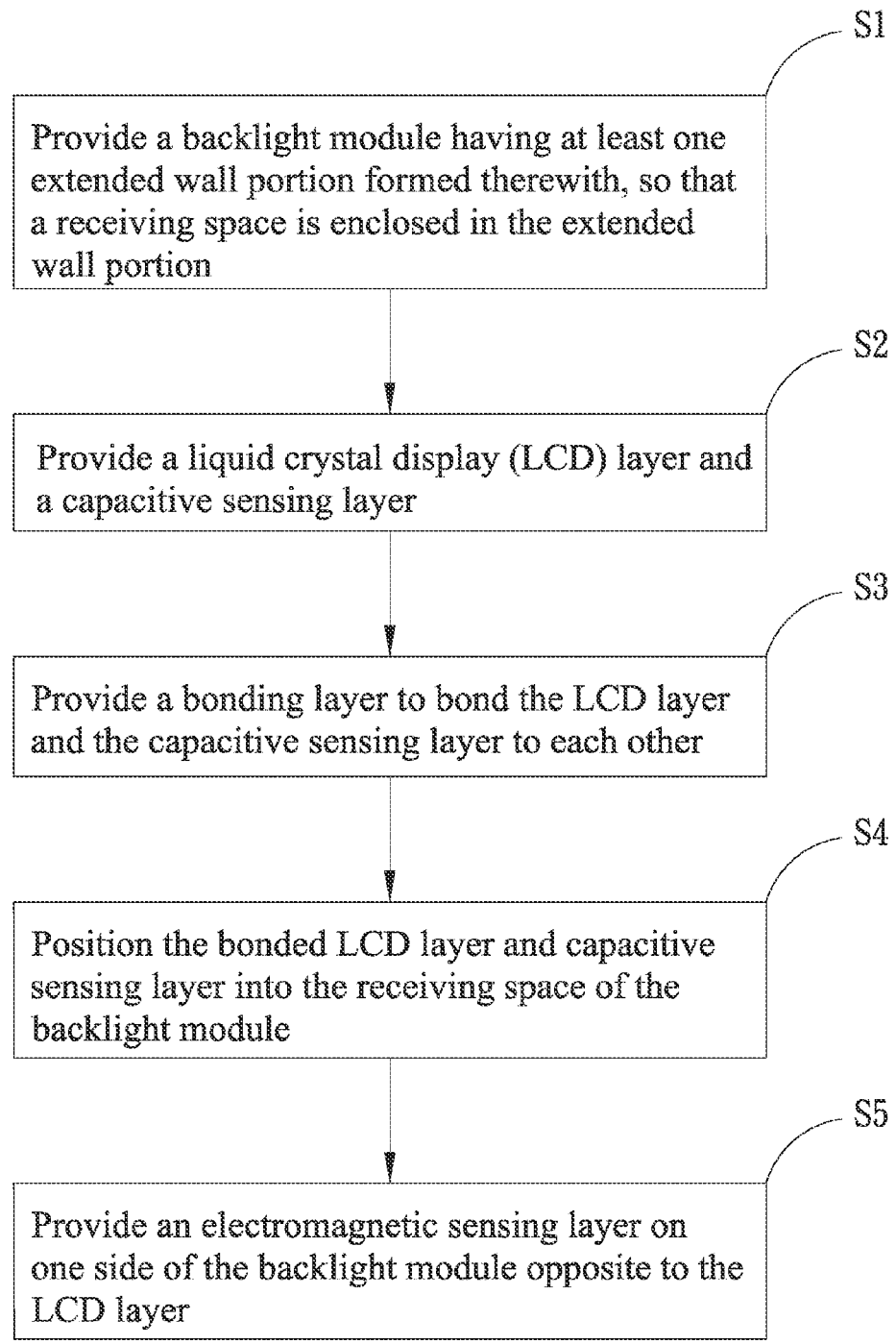
FIG. 3 is a flowchart showing the steps included in a method of manufacturing touch panel according to a second embodiment of the present invention.

FIG. 3 is a flowchart showing steps S1 to S5 included in a method of manufacturing a touch panel 1 according to a second embodiment of the present invention.

In the first step S1, a backlight module having at least one extended wall portion formed therewith is provided, so that a receiving space is enclosed in the extended wall portion; in the second step S2, a liquid crystal display (LCD) layer and a capacitive sensing layer are provided; in the third step S3, a bonding layer is provided to bond the LCD layer and the capacitive sensing layer to each other; in the fourth step S4, the bonded LCD layer and capacitive sensing layer are positioned in the receiving space defined in between the extended wall portion of the backlight module; and in the fifth step S5, an electromagnetic sensing layer is attached to one side of the backlight module opposite to the LCD layer.

Figure 4:
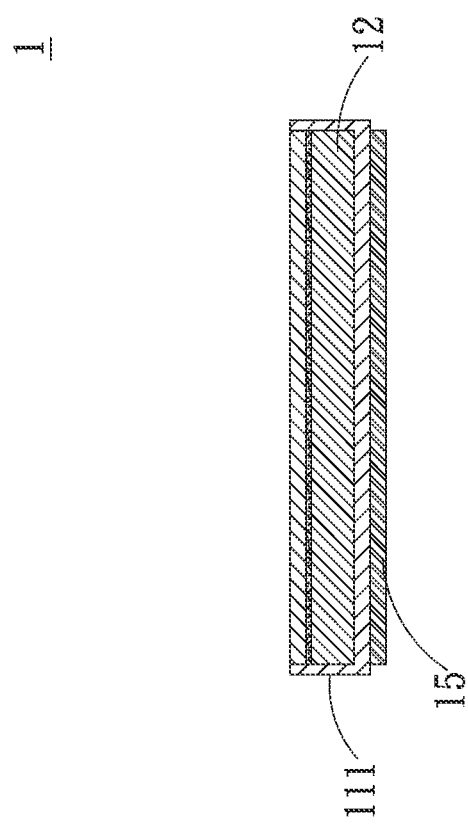
FIG. 4 pictorially illustrates the touch panel manufacturing method according to the second embodiment of the present invention.

Please refer to FIG. 4 that pictorially illustrates the touch panel manufacturing method according to the second embodiment of the present invention. As shown, the touch panel manufacturing method in the second embodiment is different from the first embodiment in that an electromagnetic sensing layer 15 is further provided after the step S4 to attach to one side of the backlight module 11 opposite to the LCD layer 12, such that the completed touch panel 1 can be used as a capacitive touch panel and an electromagnetic touch panel at the same time to provide more convenient and diversified usages.

The touch panel manufacturing method according to the present invention is superior to the conventional way of manufacturing a touch panel in that it reduces the time and labor costs for assembling the touch panel while the production yield thereof can be increased.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method of manufacturing a touch panel, comprising the steps of:
   providing a backlight module having at least one extended wall portion formed therewith, so that a receiving space is enclosed in the extended wall portion;
   providing a liquid crystal display (LCD) layer and a capacitive sensing layer;
   providing a bonding layer to bond the LCD layer and the capacitive sensing layer to each other, and any extra amount of the bonding layer flowing out from between the bonded LCD layer and capacitive sensing layer forming an overflowed portion; and
   positioning the bonded LCD layer and capacitive sensing layer into the receiving space of the backlight module, the bonded LCD layer and capacitive sensing layer having peripheral edges fitly contacting with the extended wall portion, and the overflowed portion of the bonding layer being removed from the peripheral edges of the bonded LCD layer and capacitive sensing layer by the extended wall portion.

2. The touch panel manufacturing method as claimed in claim 1, further comprising the step of providing an electromagnetic sensing layer on one side of the backlight module opposite to the LCD layer.

3. The touch panel manufacturing method as claimed in claim 1, wherein the bonding layer is selected from the group consisting of optical clear resin (OCR) and optical clear adhesive (OCA).

4. A touch panel manufactured using a method as claimed in claim 1, comprising:
   a backlight module having at least one extended wall portion formed therewith, so that a receiving space is enclosed in the extended wall portion;
   a liquid crystal display (LCD) layer arranged in the receiving space;
   a capacitive sensing layer attached to one side of the LCD layer opposite to the backlight module and located in the receiving space; and
   a bonding layer applied to between the LCD layer and the capacitive sensing layer.

5. The touch panel as claimed in claim 4, further comprising an electromagnetic sensing layer attached to one side of the backlight module opposite to the LCD layer.

* * * * *